Patented Feb. 3, 1942

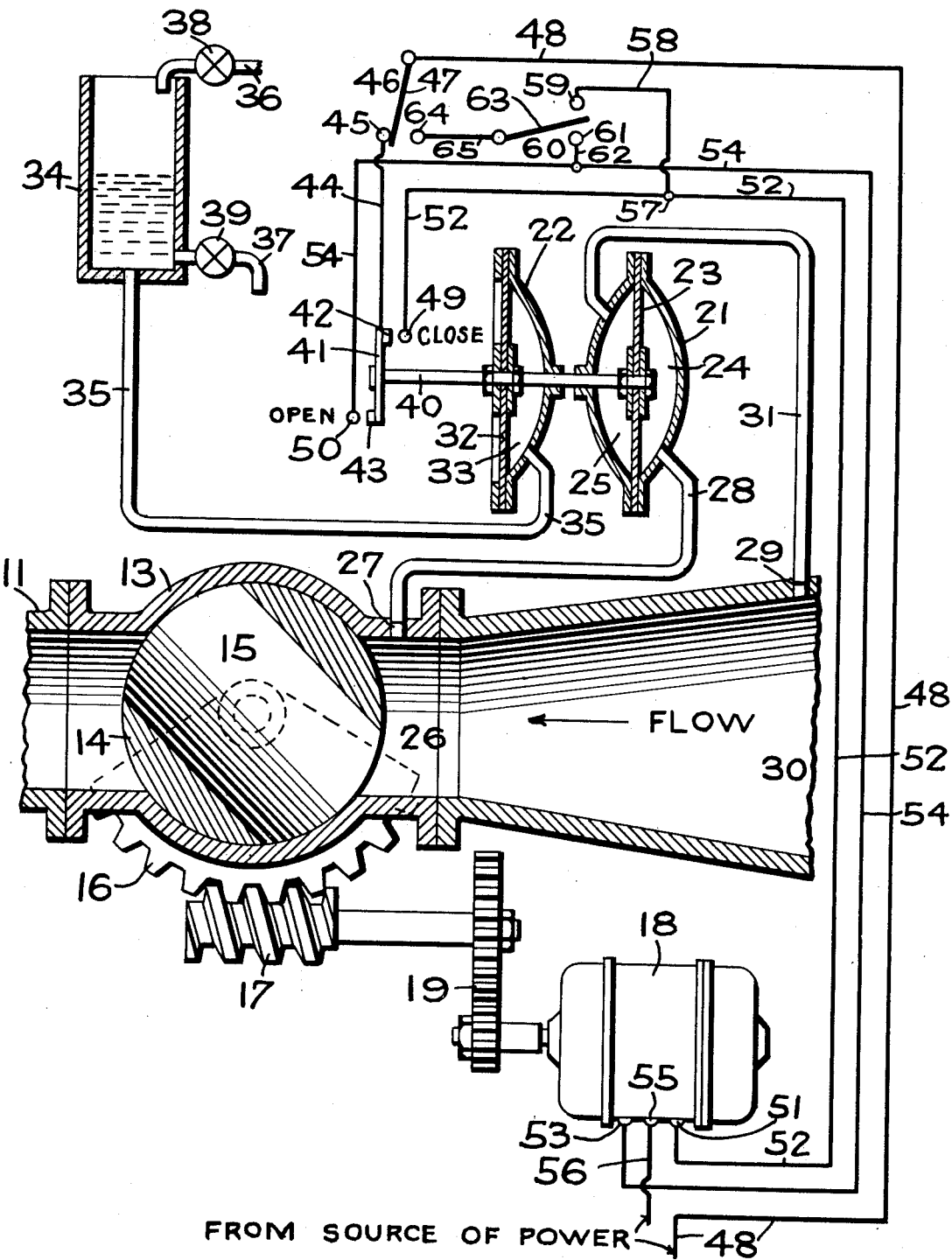

2,271,911

UNITED STATES PATENT OFFICE 2,271,911

FLUID FLOW CONTROLLER

Eugene C. Brisbane and Frank E. Peacock, York, Pa., assignors to S. Morgan Smith Company, York, Pa., a corporation of Pennsylvania Application March 22, 1939, Serial No. 263,328

7 Claims. (Cl. 200—83)

This invention relates to fluid flow controllers of the type adapted to regulate a flow of fluid through a conduit for the purpose of maintaining a uniform flow.

An object of the invention is to provide an improved fluid flow controller comprising combined hydraulic electrical means for automatically operating a valve which regulates the flow, and in which the operation of the valve is also controlled by manually operable electrical means independently of the automatic hydraulic control means.

Another object of the invention is to provide an improved fluid flow controller of the above type which is exceedingly simple of construction and efficient in operation.

Other objects and advantages of the invention will appear as the following description is read in connection with the accompanying drawing, in which the single figure is a diagrammatic view, partly in section, of a fluid flow controlling system embodying the present invention.

Referring to the drawing, from a reservoir or other source of supply, fluid is delivered to the pipe line or conduit 11 in the direction of the arrow.

A valve 13 is installed in the pipe line for the purpose of controlling communication therethrough. The valve 13 has a rotatable plug 14 with a waterway 15 formed therein.

The plug 14 is adapted to be rotated by suitable mechanism. In the present instance, the plug operating mechanism is shown as comprising a sector 16 which is fixed to one end of the stem of the valve plug 14 and has teeth in meshing relationship with the teeth of a worm gear 17.

The worm gear 17 may be driven by an electric motor 18, suitable reduction gears 19 being preferably installed between the motor 18 and the worm gear 17.

The electric motor 18 should be of the reversible type so that the worm gear 17, and consequently the sector 16, can be turned alternately in opposite directions, to effect turning of the valve plug 14 from closed to open position and vice versa.

Since the primary purpose of the valve 13 is to control communication through the pipe line 11 so that a substantially uniform flow of fluid through the pipe line will be had, means are provided for controlling the position of the valve plug 14 so as to maintain a predetermined flow of fluid.

Included in the control means of the valve are pressure responsive devices consisting of two diaphragm devices 21 and 22.

The diaphragm device 21 has a diaphragm 23 mounted in a suitable casing between two chambers 24 and 25.

The conduit 11 is formed with a contracted throat 26, the valve 13 being located on the downstream side of said throat.

Diaphragm chamber 24 is connected to a piezometer 27 at the throat 26, by a pipe 28.

Diaphragm chamber 25 is connected to a piezometer 29 at the upstream side or inlet 30 of the throat 26, by a pipe 31.

It is well known in the art that when it is desired to measure the rate of flow of fluid in a pipe line or other conduit, an orifice plate, Venturi tube, or other obstruction is inserted in the pipe line, thereby setting up one pressure on one side and another pressure on the other side. The present invention utilizes the differential set up by the measuring device, such as the venturi shown in the drawing. This is connected in the pipe line so that the flow in the direction of the arrow first reaches the inlet 30 and then passes through the throat 26.

It is in the throat 26 that pressure gives way to velocity. Assuming a fluid flow at a uniform rate the velocity in the throat 26 will exceed the pipe line velocity at the point at the right of the venturi, but the pressure head in the inlet 30 will exceed the pressure head in the throat 26. This pressure differential is utilized as the force for controlling the operation of the valve 13, as will be hereinafter more fully described.

The diaphragm device 22 has a diaphragm 32 mounted in a sutiable casing on one side of a chamber 33.

The diaphragm chamber 33 is connected to a stand pipe or tank 34 by a pipe 35. The tank 34 holds liquid which is maintained at a predetermined level by the inflow from a pipe 36 and the discharge through an outlet pipe 37. Communication through the pipes 36 and 37 is controlled by means of the valves 38 and 39, respectively.

The diaphragms 23 and 32 are both connected to a rod or stem 40 so that movement of either or both diaphragms will reciprocate said rod.

The extremity of the rod 40 carries an arm 41 to which are fixed two contact members 42 and 43.

Also connected to the arm 41 is one end of an electrical conductor 44. The other end of the conductor 44 is connected to a contact 45 of an electrical switch device 46 having a single switch arm 47.

The switch arm 47 is connected to a conductor

48 leading from a source of electric energy, as indicated on the drawing.

The contacts 42 and 43 are electrically connected with the conductor 44.

The contact 42 is adapted to engage a contact 49 when the diaphragm devices 21 and 22 operate the stem 40 in one direction, and the contact 43 is adapted to engage a contact 50 when the stem 40 is operated in the opposite direction by the diaphragm devices 21 and 22.

The contact 49 is connected to a terminal 51 of the electric motor 18 by a conductor 52, and the contact 50 is connected to a second terminal 53 of the motor 18 by a conductor 54.

A third terminal 55 of the motor 18 has connected thereto a conductor 56 leading from the source of electric energy, as indicated on the drawing.

Connected to the conductor 52 at 57, is a conductor 58 which is also connected to a contact 59 of an electric switch device 60.

A second contact 61 of the switch device 60 is connected to the conductor 54 at 62.

The switch arm 63 of the switch device 60 is connected to a contact 64 of the switch device 46, by a conductor 65.

In operation, assuming that a predetermined quantity of fluid is flowing through the pipe line 11 in the direction of the arrow, the valve plug 14 will be in an intermediate position as shown.

The pressure of the fluid supplied to the diaphragm chamber 33 from the tank 34, plus the pressure of the fluid supplied to the diaphragm chamber 24 from the throat 26 of the venturi, will equal the pressure of the fluid supplied to the diaphragm chamber 25 from the inlet 30 of the venturi. Consequently the two diaphragms 23 and 32 will be in the intermediate position shown, in which position the contacts 42 and 43 will be disengaged from the contacts 49 and 50, respectively.

When the predetermined flow of the fluid in the main pipe line 11 changes, such change in flow condition will be effective in initiating operation of the valve plug operating mechanism so that the relative position of the plug 14 will be changed to permit either an increase or decrease in the amount of fluid passing through the waterway 15, depending upon whether or not the flow has decreased or increased with respect to the normal predetermined desired flow of fluid through the main pipe line or conduit 11.

When the rate of flow decreases, the difference in pressure at the piezometer 27 (throat 26 of the venturi) with respect to the pressure at the piezometer 29 (inlet 30 of the venturi) increases. The increase in pressure of fluid in diaphragm chamber 24 will be effective in moving the diaphragms 23 and 32 toward the left so that contact 43 engages contact 50. The electric circuit will then be closed through conductor 48, switch arm 47, conductor 44, arm 41, contacts 43 and 50, and conductor 54, so that the electric motor 18 is caused to operate in the direction in which the valve plug 14 is turned by the worm gear 17 and sector 16 towards open position.

As the valve plug 14 moves toward open position the flow through the main pipe line 11 will increase. When such flow increases sufficiently, the pressure head in the inlet 30 will exceed the pressure head in the throat 26 an amount to cause the pressure of the fluid in the diaphragm chamber 25 to overcome the combined pressures in diaphragm chambers 24 and 33. In this way the diaphragms 23 and 32 will be moved toward the right thereby moving the contact 43 away from the contact 50 and opening the circuit of the electric motor 18. The valve plug 14 will now remain in the position to which it was turned until another change in the fluid flow in the main pipe line 11 occurs.

When the rate of flow in the conduit 11 increases, the diaphragms 23 and 32 will be operated in the above described manner, but in the opposite direction, to engage contact 42 with contact 49. The electric motor 18 will thus be made to operate in the direction opposite to the plug opening operation, so that the plug 14 is turned toward closed position an amount to permit the desired quantity of fluid to flow through the main pipe line 11.

As shown, switch arm 63 may be disconnected from the contacts 59 and 61 when the apparatus is operated by the combined hydraulic electrical automatically operable means heretofore described.

In case it is desired to change the operation of the apparatus from automatic to manual control, the switch arm 46 is first moved from contact 45 to contact 64, thus deenergizing the contacts 42 and 43 and energizing the switch arm 63.

To close the valve plug 14, the switch arm 63 is engaged with the contact 59, thereby closing the electric circuit from the source of power, through conductor 48, switch arm 47, conductor 65, switch arm 63 and conductors 58 and 52 to the motor 18, and from said motor through conductor 56 back to the source of power. The motor 18 is thus caused to operate in the direction in which the valve plug 14 is turned by the worm gear 17 and sector 16 towards closed position.

When the valve plug 14 has been turned towards closed position the desired amount, the switch arm 63 is disengaged from the contact 59, thereby opening the electric circuit through which energy is supplied to the motor 18. The parts of the apparatus will now remain stationary. If so desired, the valve may be turned to fully closed position.

When it is desired to manually control the turning of the valve plug 14 towards open position, the switch arm 63 is engaged with the contact 61 thereby closing the electric circuit from the source of power through conductor 48, switch arm 47, conductor 65, switch arm 63, and conductors 62 and 54 to the motor 18, and from the motor 18, through conductor 56 back to the source of electric energy.

The motor 18 is then caused to operate the valve plug 14 in the direction opposite to the direction in which the plug is turned to effect closing of the valve, so that the valve is moved towards open position.

The amount which the valve plug 14 is turned from closed to open position and vice versa, by manually operating the control switch 63, can be any fractional portion desired of the whole turning angle of the valve plug 14. This is due to the fact that the electric motor 18 can be started and stopped by operating the switch arm 63 so as to make and break the electric circuits of the motor as frequently as is necessary to effect turning of the valve plug 14 to the desired position.

Having thus described our invention, what we claim is:

1. Switch operating mechanism comprising, a diaphragm device having means for imposing different fluid pressures on opposite sides of the diaphragm, a second diaphragm device having its diaphragm subject on one side only to a source of predetermined fluid pressure, a rod connecting both of said diaphragms and having an end terminating at a point distant from said diaphragms, said rod being adapted to be actuated by either or both of the diaphragms, said second diaphragm device being adapted through said rod to impose a constant loading pressure on the first diaphragm to keep said first diaphragm normally balanced, and an electric switch device connected to the extremity of said rod and operated by said rod when said diaphragms are unbalanced in either direction to engage a contact member.

2. Switch operating mechanism comprising, a diaphragm device having means for imposing different fluid pressures on opposite sides of the diaphragm, a second diaphragm device having its diaphragm subject on one side only to a source of predetermined fluid pressure, a rod connecting both of said diaphragms and having an end terminating at a point distant from said diaphragms, said rod being adapted to be actuated by either or both of the diaphragms, said second diaphragm device being adapted through said rod to impose a constant loading pressure on the first diaphragm to keep said first diaphragm normally balanced, and an electric switch device connected to the extremity of said rod and operated by said rod when said diaphragms are unbalanced in one direction to engage a contact member, said switch device being adapted to engage a second contact member disposed in spaced relation to the first contact member when the diaphragms are unbalanced in the other direction.

3. Switch operating mechanism comprising, a diaphragm device, means for imposing different fluid pressures on opposite sides of the diaphragm, a second diaphragm device having its diaphragm subject on one side only to a source of predetermined fluid pressure, a rod connected to both of said diaphragms and adapted to be actuated by either or both of the diaphragms, said second diaphragm device being adapted through said rod to impose a constant loading pressure on the first diaphragm to keep said first diaphragm normally balanced, an electric switch device connected to said rod and operated by said rod when either of said diaphragms are unbalanced, said electric switch device being normally dormant so long as said first diaphragm remains balanced but which is rendered operative upon a flexure of said first diaphragm.

4. Control apparatus of the type described comprising an electric switch device adapted to remain normally in open position, a fluid pressure device having a diaphragm adapted to be operated by variations in the differences of fluid pressure, a second fluid pressure device connected to the first fluid pressure device and responsive to a source of predetermined fluid pressure for imposing a constant loading pressure on the first fluid device so as to keep said diaphragm normally balanced, and a single means connecting both of said fluid pressure devices with said electric switch device for actuating said switch device when said diaphragm becomes unbalanced.

5. A control system of the type described comprising a switch device, fluid pressure responsive means operated by variations in differences of fluid pressure, a second fluid pressure responsive means operated by fluid under predetermined pressure which normally balances the pressures of said first fluid pressure responsive means, and a single rod for connecting both of said fluid pressure responsive means to said switch device, said fluid pressure responsive means being adapted to hold said switch device open as long as a predetermined amount of fluid acts on said fluid pressure responsive means and being adapted to operate said switch device when one of the fluid pressures predominates.

6. Switch operating mechanism comprising a fluid pressure device having pressure responsive means operated by variations in fluid pressure on opposite sides thereof, a second fluid pressure device having pressure responsive means connected to said first fluid pressure responsive means, said second fluid pressure responsive means being connected to a source of predetermined fluid pressure so as to impose a constant loading pressure on the first fluid pressure responsive means to keep the latter means normally balanced, an electric switch device having a movable element, a single means for connecting said movable element to the pressure responsive means of both of said fluid pressure devices, a contact member adapted to be engaged by said movable switch element, a second contact adapted to be engaged by said movable switch element, the movable switch element being adapted to remain disengaged from said contacts as long as the first pressure responsive means remains balanced and being adapted to engage either one of said contacts when said fluid pressure responsive means are unbalanced.

7. Switch operating mechanism of the type described comprising a diaphragm device operated by variations in the differences of fluid pressure supplied to the opposite sides thereof, a second diaphragm connected to the first diaphragm and having one side thereof connected to a source of predetermined fluid pressure and adapted to normally balance the first diaphragm, and a single rod connecting both of said diaphragms with said switch whereby said switch is operated by a flexure of the diaphragms when one of the fluid pressures predominates.

EUGENE C. BRISBANE.
FRANK E. PEACOCK.